United States Patent
Jhingan et al.

(10) Patent No.: US 9,503,280 B2
(45) Date of Patent: Nov. 22, 2016

(54) METHODS AND SYSTEMS FOR EMAIL INTEGRATED FILE DELIVERY

(75) Inventors: Nikhil Jhingan, Singapore (SG); Vinod U. Vasnani, Singapore (SG); Chee Siang Lim, Singapore (SG); Neeraj Arora, Singapore (SG); E. Vijay Rao, New Delhi (IN); Amit Mongia, New Delhi (IN)

(73) Assignee: ACCELLION PTE LTD., Singapore (SG)

( * ) Notice: Subject to any disclaimer, the term of this patent is extended or adjusted under 35 U.S.C. 154(b) by 1727 days.

(21) Appl. No.: 10/389,244

(22) Filed: Mar. 17, 2003

(65) Prior Publication Data
US 2004/0186894 A1 Sep. 23, 2004

(51) Int. Cl.
| G06F 15/16 | (2006.01) |
| H04L 12/58 | (2006.01) |
| G06Q 10/10 | (2012.01) |
| H04L 29/08 | (2006.01) |
| H04L 29/06 | (2006.01) |

(52) U.S. Cl.
CPC ............. H04L 12/58 (2013.01); G06Q 10/107 (2013.01); H04L 51/08 (2013.01); *H04L 51/063* (2013.01); *H04L 63/04* (2013.01); *H04L 63/083* (2013.01); *H04L 67/02* (2013.01); *H04L 67/2842* (2013.01)

(58) Field of Classification Search
CPC ..................... H04L 51/08; H04L 12/58; H04L 51/063; H04L 67/02; H04L 67/2842; G06Q 10/107
USPC ................................................ 709/236, 206
See application file for complete search history.

(56) References Cited

U.S. PATENT DOCUMENTS

| 5,771,355 | A | * | 6/1998 | Kuzma ........................ 709/232 |
| 5,781,901 | A | * | 7/1998 | Kuzma |
| 6,134,566 | A | * | 10/2000 | Berman ............... G06Q 10/107 709/206 |
| 6,275,848 | B1 | * | 8/2001 | Arnold ........................ 709/206 |
| 6,397,261 | B1 | * | 5/2002 | Eldridge et al. .............. 713/171 |
| 6,505,236 | B1 | * | 1/2003 | Pollack ........................ 709/206 |
| 6,769,067 | B1 | * | 7/2004 | Soong ..................... H04L 12/58 726/1 |
| 6,839,741 | B1 | * | 1/2005 | Tsai ............................ 709/217 |
| 7,113,948 | B2 | * | 9/2006 | Jhingan .................. H04L 12/58 |
| 7,178,099 | B2 | * | 2/2007 | Meyer et al. ................. 715/210 |
| 2001/0054073 | A1 | * | 12/2001 | Ruppert et al. ............... 709/206 |
| 2002/0016818 | A1 | * | 2/2002 | Kirani et al. ................. 709/203 |
| 2002/0059384 | A1 | * | 5/2002 | Kaars ........................... 709/206 |

(Continued)

FOREIGN PATENT DOCUMENTS

WO WO 01/27828 A2 4/2001

*Primary Examiner* — Oleg Survillo
(74) *Attorney, Agent, or Firm* — Finnegan, Henderson, Farabow, Garrett & Dunner LLP

(57) ABSTRACT

Methods and systems consistent with the present invention provide a file delivery system for transmitting files to recipients using email, which may be used with existing email infrastructure. Email clients may "attach" files to an email by an attachment process. The attachment process, however, associates a placeholder with the email instead of the actual file. The placeholder is replaced with a URL link to the file and the email is sent. The system moves the attachments over the network to a remote server that is capable of delivering the attachments to the email recipients. File attachments are routed to recipients independent of the associated email.

20 Claims, 8 Drawing Sheets

(56) References Cited

U.S. PATENT DOCUMENTS

| | | | |
|---|---|---|---|
| 2002/0065892 A1* | 5/2002 | Malik | 709/206 |
| 2003/0055907 A1* | 3/2003 | Stiers | 709/206 |
| 2003/0115273 A1* | 6/2003 | Delia | G06Q 10/107 709/206 |
| 2003/0158928 A1* | 8/2003 | Knox et al. | 709/223 |
| 2004/0068544 A1* | 4/2004 | Malik | H04L 12/58 709/206 |
| 2004/0068695 A1* | 4/2004 | Daniell | G06Q 10/107 715/234 |
| 2004/0177271 A1* | 9/2004 | Arnold | G06Q 10/107 713/154 |

\* cited by examiner

METHODS AND SYSTEMS FOR EMAIL INTEGRATED FILE DELIVERY

DESCRIPTION OF THE INVENTION

Field of Invention

The present invention relates generally to communications between computer systems and, in particular, to methods and systems for email and file delivery.

Background of the Invention

As computer networks have developed into a means of structuring, sharing and transferring information, information systems such as electronic mail (email) have facilitated communication and information management. Users on a computer network generally use email to communicate private messages with each other. However, email has rapidly evolved into a new standard communication medium moving beyond the typical memo framework to one of a universal tool for conducting business. The capability to send any type of data attached as a file to an email message is increasingly used not only for dissemination of information but as a means of business collaboration. Thus, email attachments have become a vital component of an organization's workflow.

Even after the last few years of the Internet revolution, which has generated a multitude of collaboration software and services, email still accounts for 90-95% of all electronic collaborative activities in an enterprise.

Computer networks used by organizations typically comprise email servers. The email server is a computer hardware platform where application software responsible for receiving, transmitting, routing and archiving emails resides. Users of such a computer network typically have client versions of an email application software for creating, sending, receiving and organizing emails installed on personal workstations. The size of email attachments used for collaboration varies considerably depending on the application. However, the trend is towards larger and larger files typically associated with rich media applications, such as audio and video applications.

Another major constraint on the usage of attachments for collaboration in some email environments is the large amount of time it requires to attach large files in an email client, that is, the time from when a user chooses a file as an attachment to the point when the user is able to activate the send button to send the email and attachment. In some email clients, this takes a significant amount of time as the entire attachment is first retrieved from an archive, typically an internal storage device such as a hard disk inside the personal workstation, before the control of the email application is returned back to the user. Another major constraint is that the email client is frequently tied up during the process of sending of emails with large attachments.

Furthermore, the volume of data passing through the email systems has increased beyond the capabilities of existing infrastructure of many corporations resulting in strained bandwidth networks, unmanageable growth in distributed storage requirements and having an adverse impact on unrelated mission critical communications. Moreover, with the routing of large email attachments through existing email servers may come the associated problems of excessive data loss or latency, excessive time to retrieve large files, and reliance on low technology alternatives to recover from failures and lack of effective and accurate reporting capabilities. These problems can be compounded by strained IT resources, a need to extend the life of existing infrastructure, a desire to increase the quality of other network services, a demand for an inherent fail-over mechanism for critical systems, or a requirement of accurate data for forecasting and planning infrastructure growth and tracking of resource utilization by business unit (i.e. department, partner, client and geographic region or specific location) for subsequent charge back.

Conventional email file attachment delivery methods and systems are not efficient and difficult to manage, causing staff to lose precious productivity time transferring large files to compact disc (CD), printing hardcopy of the large files for sending by traditional courier, or using other ad-hoc manual tools such as the public File Transfer Protocol (FTP) servers and file-sharing servers which are potentially vulnerable and do not address the issue of lifecycle management of these often sensitive files.

The negative impact on operational productivity and the related infrastructure has generated a compelling need for a solution that meets both business and technical requirements. One such requirement, from the perspective of an enterprise, is to provide a solution that supports the tools employees are most familiar with, so as to maintain the existing business process and workflow.

SUMMARY OF THE INVENTION

Email distribution methods and systems consistent with the present invention are described herein for providing a seamless, enterprise-wide file delivery solution for enabling collaboration through large email attachments by providing a framework for their file attachment, storage, transport, access and lifecycle.

In accordance with one embodiment of the invention, there is disclosed a method for delivering a data file as an email attachment in a computer system having an email server, a hosting server and a client computer in data communication with the email server and the hosting server consistent with the present invention may comprise composing an email having a message portion using an email client application running on the client computer, the email having a source system and a destination system being associated thereto. The method may further comprise initiating an attachment routine for attaching a data file to the email and generating a placeholder for associating the data file selected by a user to the email for including into the message portion of the email in response to the attachment routine being activated and identifying the data file for attaching to the email. The data file indicated by the placeholder may be retrieved and delivered to the hosting server. The email is delivered to the email server upon the data file being transferred to the hosting server.

In accordance with another embodiment of the invention, there is disclosed an email distribution system for delivering a data file as an email attachment, the system comprising means for composing an email having a message portion using an email client application running on a client computer, the email having a source system and a destination system being associated thereto; means for initiating an attachment routine for attaching a data file to the email; means for generating a placeholder for associating the data file selected by a user to the email for including into the message portion of the email in response to the attachment routine being activated and identifying the data file for attaching to the email; means for retrieving the data file indicated by the placeholder; means for delivering the data file to a hosting server; and means for delivering the email to a email server upon the data file being transferred to the hosting server.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

DETAILED DESCRIPTION OF THE INVENTION

Figure 1:
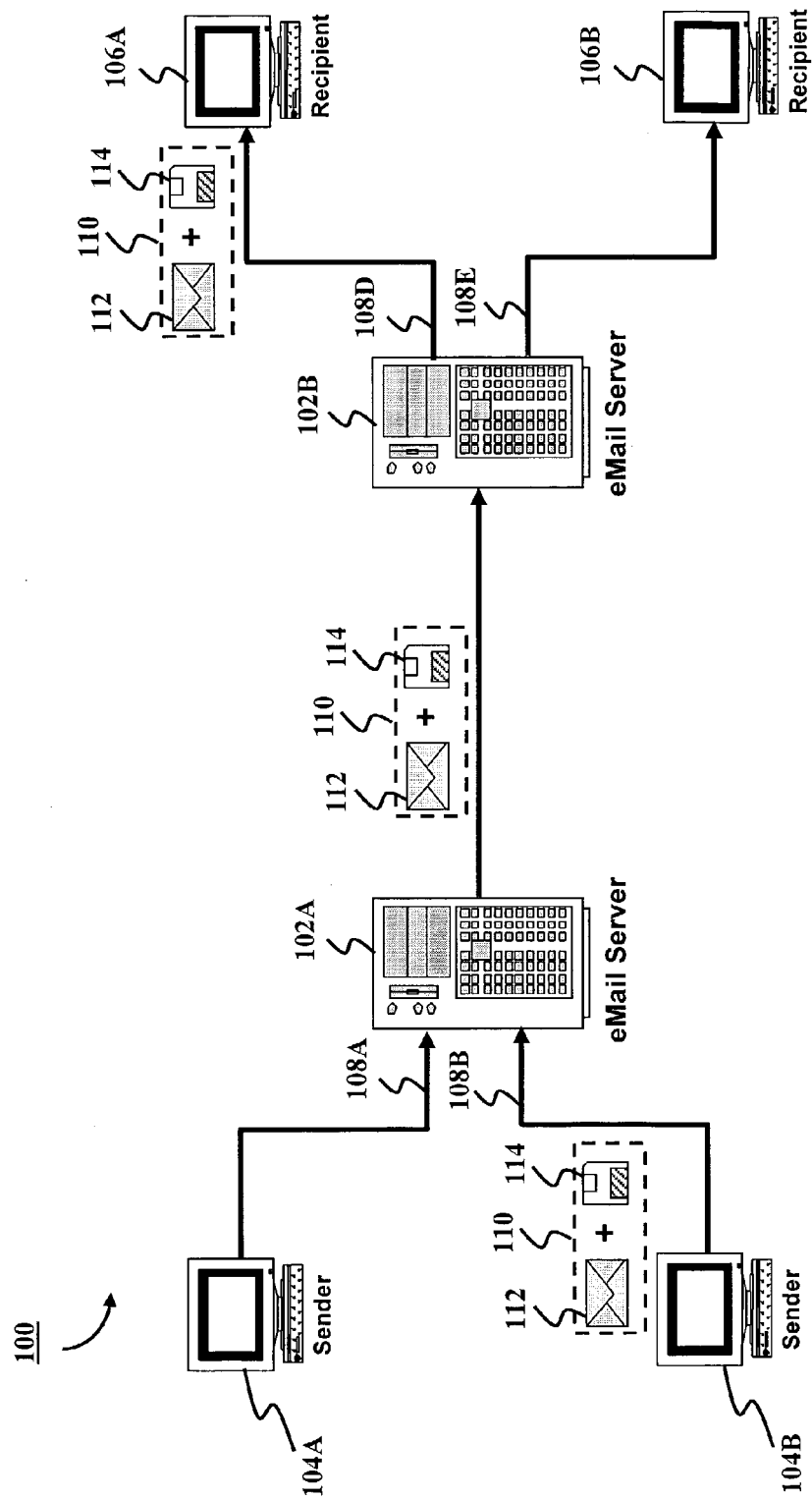
FIG. 1 shows a simplified prior art block diagram of a typical network of email servers and email clients and the data flow therein.

An email distribution system for providing seamless enterprise wide message and data file delivery for enabling business collaboration is described hereinafter. Embodiments of the invention are described with reference to the figures of the drawings, wherein like elements are identified with like reference numerals.

Certain embodiments of the present invention enable an email sender to attach large files from the familiar email interface quickly and efficiently by modifying the process of attaching based on policies that are driven by configurable parameters. For example, in one embodiment, only attachments that meet a threshold size would be attached using this mechanism. The attachment process is swift as the time consuming process of attaching the file to the email is bypassed and all further processing is shadowed for background operation. The attachment process inserts a placeholder in the email instead of the attachment and, when the user sends the email, these attachments may be further encapsulated inside larger units referred to as "packages." These packages may be subsequently transferred to a server capable of communicating on any one of a set of protocols through an integrated transport system.

The principles of the present invention may be used with existing protocols and methods for large file transfer. In certain embodiments of the present invention, the transfer can be optionally governed by configurable parameters such as, but not limited to, the upload destination, transport protocols, minimum allowable transfer rates and time-outs and upload caches. Examples of the transport protocols are HTTP, HTTPs, FTP and UDP based transports. However, the system is not limited to these transport protocols and can use any method of transport available on a computer network. Among other criteria, the protocols can be chosen based on security and performance needs of the Enterprise.

After the successful transfer, an email processing module replaces the placeholders with embedded links (URLs) which can be used to retrieve the attachment from the Internet or Intranet and then sends the email to the intended recipients. Since, in certain embodiments, the attachments and email are sent by the email processing module in the background, the user perception of the sending process is comparable to sending an email without any attachments, regardless of the size and number of the attachments associated with the email.

While the attachment is processed in the background, the email may be moved to a pending folder where it is held until the attachment is processed. When the email arrives at the recipient, the attachment is available for download, similar to how email works today. While attachments are being packaged and transferred, the user can continue with other tasks in the email client.

Each set of attachments of an email may be treated as a "package." Along with the attachments, each package may optionally contain a meta-file that encapsulates meta information regarding the package itself. For example, this information may comprise the sender's email, recipients, list of attachments as well as its attributes such as size and type. It can also comprise various attributes of the email such as return receipt and has the provision for associating job codes with each attachment. The job codes allow for attachment tracking as well as enabling costs to be charged back to financial systems. This is analogous to present day shipping of physical packages for which a tracking identification is used as well as charged back to department accounting.

Thus, certain embodiments of the present invention enable seamless usage of existing email workflow for collaboration on large files without disrupting or impacting other applications and services. Furthermore, certain embodiments may allow for policy-based management of attachments through the use of optional parameters like attachment size. Certain embodiments of the present invention also provide recipient authentication based on enterprise directory standards like Lightweight Directory Access Protocol (LDAP) to prevent attachment forwarding, delivery confirmation to allow the sender of emails to be notified when the recipients download their email attachments and automated background replication of attachments to thee recipients' preferred remote servers. Another option is for securing previously non-secured method of collaboration via email attachments.

Existing email distribution networks such as the email distribution network 100 shown in FIG. 1, comprise email servers 102A and 102B and email clients 104A, 104B, 106A and 106B that are typically located at different geographical locations within an enterprise. The email servers 102A and 102B and the email clients 104A, 104B, 106A and 106B are electronically interconnected by communication links 108A-108E as seen in FIG. 1. When a user sends an email with or without a data file attachment (attachment) to a recipient, the email traverses the communication links from the sending email client to the recipient email client. For example, when email client 104B (sender) sends an email 110 containing a message portion 112 and an attachment portion 114 to email client 106A (recipient), the email 110 traverses communication link 108B to the email server 102A. The email server 102A then forwards the email 110 to the email server 102B via the communication link 108C. Finally, the email server 102B forwards the email 110 to the recipient via the communication link 108D. Existing email distribution networks deliver emails and the attachments together. As such, these existing networks are more suited for delivering emails without any attachment or with attachments that are small in size. For emails with large size attachment or many attachments, existing email distribution networks present a number of limitations. As described in the foregoing, some of these limitations include the lengthy period required by the email clients to retrieve and attach large files, the email and the large attachment have to traverse a tortuous and inefficient route over the communication links of the network of email servers to reach the recipients and in the process consume valuable resources such as storage space, delivery time and network bandwidth.

Figure 2:
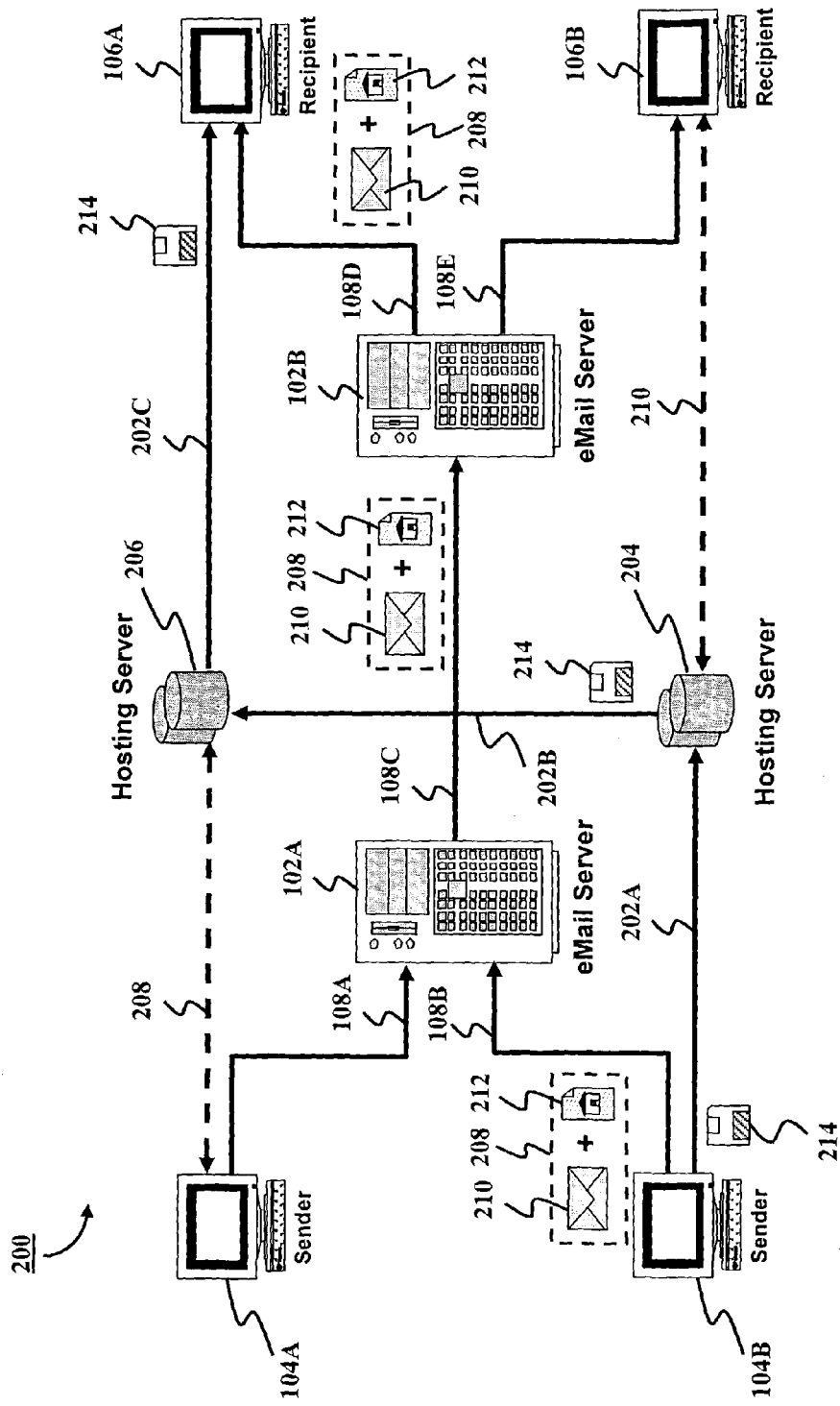
FIG. 2 shows a block diagram of a network of email servers, email clients and hosting servers and the data flow therein in accordance with an embodiment of the invention.

The email distribution system according to an embodiment of the invention for efficiently delivering emails with large attachment includes an email distribution network 200 as shown in FIG. 2 and the various modules as described hereinafter. The email distribution network 200 makes use of existing email distribution networks with the addition of at least one hosting server. As an example, the email distribution network 200 comprises email servers 102A and 102B, email clients 104A, 104B, 106A and 106B, hosting servers 204 and 206 and communication links 108A-108E and 202A-202C. The email servers 102A and 102B and the email clients 104A, 104B, 106A and 106B are electronically interconnected by the communication links 108A-108E which is the existing email distribution network 100 as shown in FIG. 1. The hosting server 204 is electronically connected to the email clients 104B and 106A via the communication links 202A and 210, respectively. Similarly, the hosting server 206 is electronically connected to the email clients 104A and 106A via the communication links 208 and 202C, respectively. The hosting servers 204 and 206 are further electronically interconnected by the communication link 202B for transferring data therebetween. In the exemplary embodiment shown in FIG. 2, the communication links 208 and 210 are shown as dotted lines to indicate that the communication links are not in use. Further, the solid lines with arrows merely indicate the data flow in at least one embodiment of the invention. In practice, these communication links may be bi-directional.

According to an embodiment of the invention, when a user at the email client 104B wishes to send an email with a data file attachment (attachment) to a recipient at the email client 106A, the email and the attachment are delivered separately. The data flows and the sequence of steps carried out by the sending email client 104B for sending the email and the attachment, and the receiving steps carried out by the receiving email client 106A, are described hereinafter.

Typically, email clients are provided with an email client application running on the email client machine. The email client application allows a user to compose messages and send the messages as an email 110, as shown in FIG. 1, with or without an attachment to a recipient connected to the email distribution network. The email 110 contains a message portion 112 and an attachment portion 114, if any. In at least one embodiment, the existing email client application is augmented to provide extra functionality for providing an efficient method for delivering email with large attachment efficiently to the desired recipient(s). The augmentation may involve, for example, providing a file-attaching module, a background email processing module and/or a file-uploading module for integrating into the existing email client application. The file-attaching, background email processing, and file-uploading modules may be software programs that may be embedded into an existing email client application to provide an augmented email client application, hereinafter referred to as the email client application. However, it is obvious to one skilled in the art that these modules, namely the background email processing and the file-uploading modules can function independently from the existing email client application. As such, these modules do not have to be integrated into the existing email client application.

In addition to the existing attach button commonly found in existing email client applications, the email client application is provided with a second attach button for allowing the user to attach data files to the email in an efficient way. As such, the second attach button works differently from the existing attach button as described hereinafter.

File-Attaching Module

Figure 3:
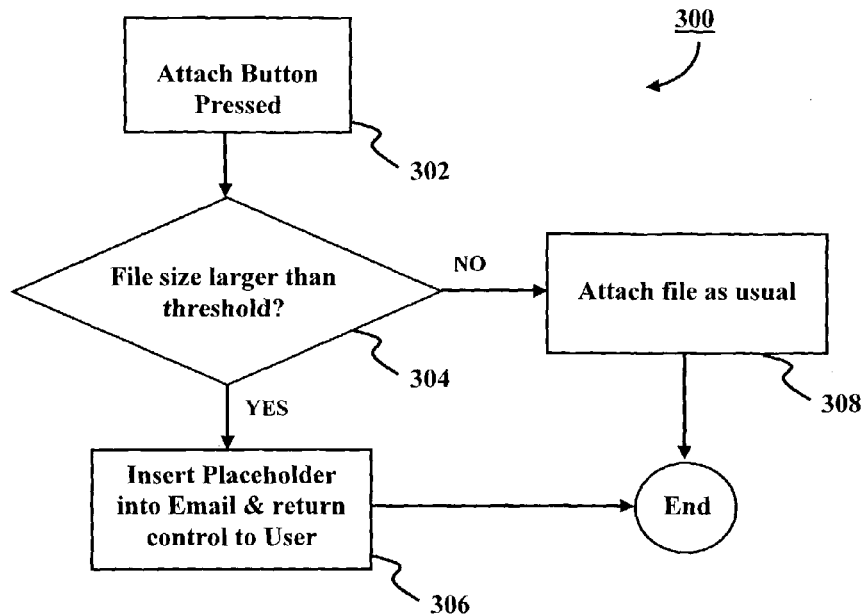
FIG. 3 shows a process flow diagram of a placeholder-inserting task according to at least one embodiment of the invention.
Figure 4:
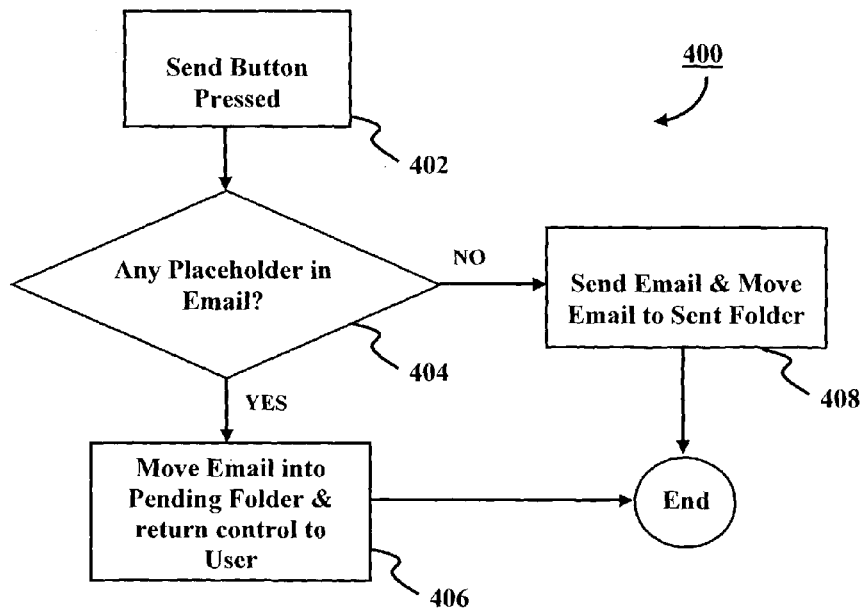
FIG. 4 shows a process flow of an email sending initiating task according to at least one embodiment of the invention.

The file-attaching module is activated in response to events triggered by a user pressing the second attach button or the send button in the email client application. The file-attaching module comprises two tasks. The first task is a placeholder-inserting task 300 as shown in FIG. 3. The placeholder-inserting task is activated in response to the user pressing the second attach button. The second task is an email sending initiating task 400 as shown in FIG. 4. The email sending initiating task is activated in response to the user pressing the send button.

Second Attach Button

When the user presses the second attach button at a step 302, the placeholder-inserting task 300 is activated. Like in conventional programs, the user may be prompted to select an attachment to be attached to an email. Once the user has selected the attachment, the attachment size may be compared against a configurable preset threshold in a step 304. If the attachment size is equal to or smaller than the preset threshold, a placeholder is inserted into the email instead of the actual attachment. The placeholder may be a pointer pointing to the actual attachment the user selected or some equivalent data associated with the selected file. In some conventional email client applications, the file attaching procedure retrieves the attachment immediately after the user selects the attachment. If the attachment is large, the retrieval time is undesirably long and the user has to wait for the retrieval to finish. In at least one embodiment of the present invention, the time required to insert a placeholder into an email is substantially shorter regardless of how large the attachment is. Thus, the user quickly gains control of the email client application. Further, the placeholder can be easily removed should the user change his or her mind before sending the email. However, if in the step 304, the attachment size is smaller then a preset threshold, the attachment may be retrieved and attached to the email using conventional measures in a step 308. In certain embodiments of the present invention, placeholders may be used regardless of file size.

The placeholder-inserting task 300 can also comprise a prompt to allow the user to enter job code or project identification information for association with the attachment selected by the user. The job code can, for example, be an alphanumeric tag that is used to associate the attachment with a corresponding project identification for accounting charge back purposes. The job code and project identification associated with the attachment can be used to track resource usage and subsequent client charge back for the bandwidth and storage cost associated with the transfer and lifetime of the attachment (i.e. the length of time the attachment is retained by the hosting server before it is deleted).

Certain embodiments of the present invention allow encryption of the attachment. For example, when the user selects the option, the user may also indicate that the file should be encrypted. In other cases, when the user selects a file, a parameter may be written in the placeholder to indicate that the attachment is to be encrypted. Files may be encrypted using any one or more conventional encryption methods, such as BlowFish or PGP. The sender may also provide the recipient with the means to decrypt the attachment via a separate email or through any other medium.

Send Button

When the user presses a send button at a step 402, as shown in FIG. 4, the email sending initiating task 400 is activated. The task 400 proceeds to check the email for placeholders in a step 404. If a placeholder is found, the email may be moved to a pending folder for further processing by the background email processing module in a step 406. However, if no placeholder is found in the email at the step 404, the email may be delivered in accordance with the existing procedure in a step 408. In the existing procedure, the email may be sent directly to the email server 102A without further processing at the email client 104B machine. Once a copy of the email is sent to the email server 102A, for example, the email may be moved to the sent folder after which the control of the email client application is released back to the user. In the step 406, once the email with the placeholder is moved to the pending folder, the control of the email client application may be immediately returned to the user. Thus, the user does not have to wait for the email to be sent, which can be time consuming if the attachment is large.

Background Email Processing Module

Figure 5:
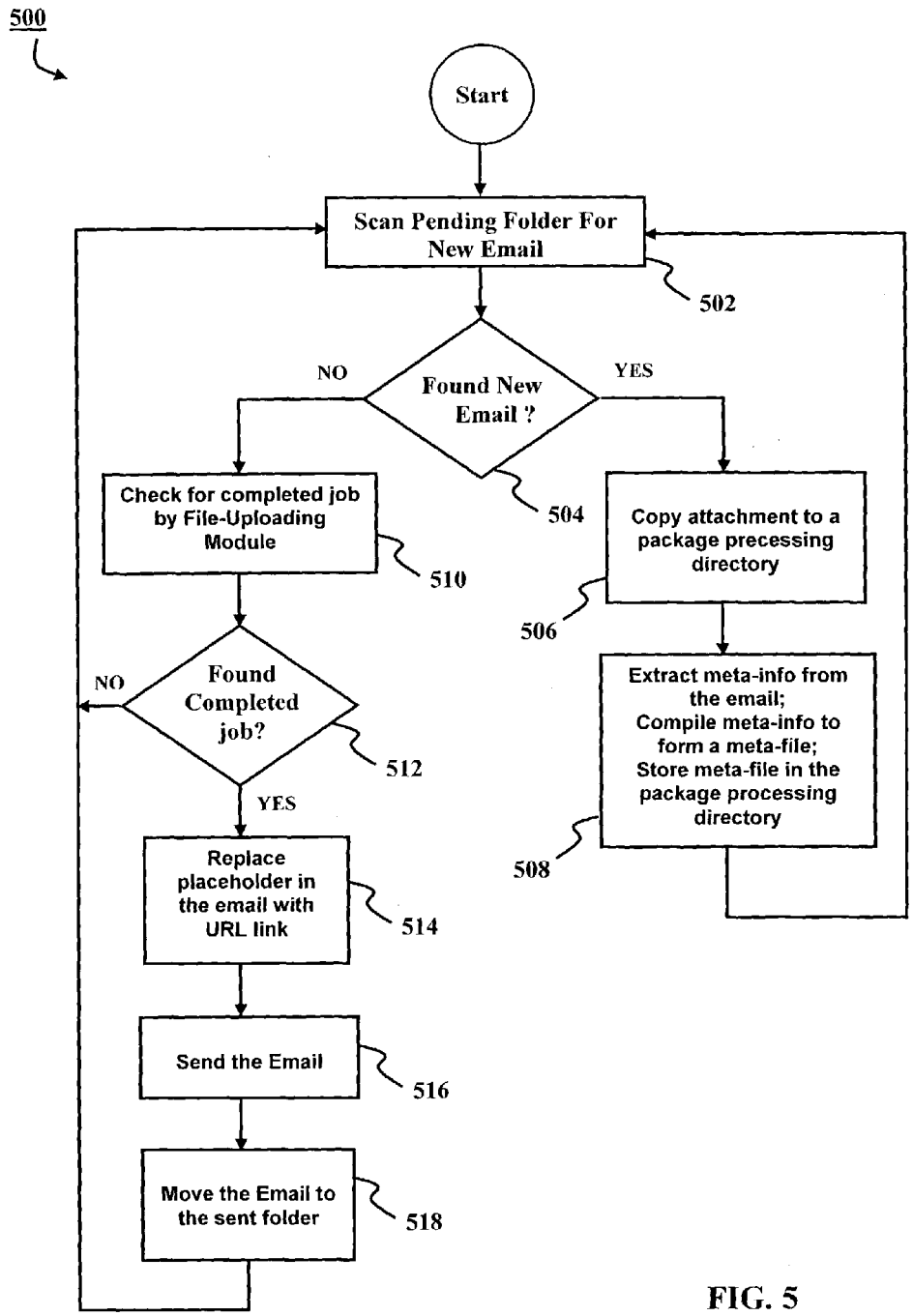
FIG. 5 shows a process flow of a background email processing task according to at least one embodiment of the invention.

The background email processing module operates in the background of the email client application carrying out a background email processing (BEP) task 500 as shown in FIG. 5. The background email processing module may be activated when the user launches the email client application.

Once activated, the BEP task 500 scans the pending folder for emails to process at a step 502. If a new email is found in the pending folder in a step 504, the attachment pointed to by the placeholder may be encapsulated as a package and copied into a package processing directory in a step 506. Additionally, if the placeholder indicates that the attachment is to be encrypted, the BEP task 500 will then encrypt the attachment as well. The BEP task 500 then may extract meta-information from the email and the sender profile that may be residing in the email server 102A and may compile the meta-information to provide a metafile in a step 508. Meta-information extracted from the email may comprise, for example, the sender email address, recipient list, names of attachments and job code associating with the attachments. The BEP task 500 then may store the meta-file in the package processing directory in the email client 104B machine for further processing by the file-uploading module and reverts back to the step 502.

However, if no new email is found in the pending folder in the step 504, the BEP task 500 proceeds to a step 514 to check for any completed job performed by the file-uploading module. When the file-uploading module has completed uploading the attachment 214 and the meta-file, the package processing directory may be renamed to indicate, for example, that the attachment 214 is successfully uploaded to the hosting server 204.

Detailed description of an exemplary file-uploading module and its functions are provided hereinafter. If no completed job is found in a step 516, the BEP task 500 reverts back to the step 502. However, if a completed job is found, the BEP task 500 proceeds to a step 514. In the step 514, the placeholder in the email is replaced by a corresponding link to form an email package 208 having a message portion 210 and a link portion 212. The corresponding link indicates where the attachment pointed to by the placeholder is being stored. The corresponding link may be provided by the file-uploading module and may be, for example, a uniform resource locator (URL), a uniform resource identifier (URI), or a uniform resource name (URN). Each placeholder may have a unique corresponding link. Thus, if the email has two placeholders (indicating that the user has selected two data files to be attached with the email), two separate corresponding links are provided. The link optionally contains other information gathered from the meta-file embedded in it like the job code associated with the attachment and if the email sender requested for a download confirmation and the like verification functions.

After replacing the placeholder with the corresponding link in the step 514, a copy of the email package 208 is sent to the email server 102A in a step 516 via the communication link 108B. The BEP task 500 then moves the email package 208 to the sent folder in accordance with the existing procedure in a step 518 and reverts back to the step 502. Thus, the BEP task 500 ensures that at or near the time the recipient at the email client 106A receives the email package 208, the attachment 214 is ready for downloading from the location pointed to by the corresponding link 212.

The BEP task 500 may be terminated when the user terminates the email client application. However, when the user terminates the email client application and the BEP task 500 is in the middle of processing an email, the user can be prompted to confirm if he or she wants to terminate the email client application. If the user confirms the termination of the email client application, an automatic resumption of the email processing by the BEP task 500 can be included in the BEP task the next time the email client application is launched. The BEP task 500 can be modified to provide a termination preventing feature that prevent the user from terminating the email client application until a critical processing is finished. For example, the email client application may be prevented from being terminated when the BEP task 500 is busy processing an urgent email.

Further, the BEP task 500 can be modified to provide an email sending cancellation process for canceling an email in the pending folder. The email sending cancellation process may allow the user to select an email residing in the pending folder and instruct the BEP task 500 to refrain from processing the email. The email can then be deleted, modified, or saved for sending at a later time.

Certain embodiments of the present invention support the dynamic application of any changes in the configurable parameters. For example, the FU task 600 may poll the hosting server 204 for any changes in configurable parameters such as the location list to be used for uploading the attachment 214, the threshold for attachment size that will operate for special attaching for the email clients 104(A-B) and 106 (A-B), the time for which the links inserted in the email will cease to be valid after insertion, whether automated notification by email to the sender on the successful download of the attachments is enabled or not, whether recipient authentication feature (i.e. the ability to configure whether or not a recipient must enter a password before downloading an attachment) is enabled or not, and the like verifying functions. Any changes made by the administrator at the hosting server 204 may thus applied in a dynamic manner without restarting the email client application. Subsequent emails may be processed using the updated parameters automatically without the user being aware of any changes in the application behavior or policies.

File-Uploading Module

In certain embodiments consistent with the present invention, the file-uploading module is an integrated transport system, capable of leveraging several protocols and methods for large file transfer again according to specific parameters, for example, the transport protocol to be used. The file-uploading module can communicate with the hosting server 204 on any one of the protocols supported by the hosting server 204 using the HTTP, HTTPS, FTP or the like file transfer protocols supported by the email server 102A and hosting server 204. The file transfer protocol may be chosen based on the requirements of the file transfer situation. For example, HTTP or FTP may be the best option for efficient file transfer and HTTPS may be best for secure file transfer over the Internet.

In certain embodiments of the present invention, the efficiency of the file-uploading module may by improved by use of parallel processing. Parallel processing may be enabled by, for example, configuring multiple network connections to use multiple HTTPS tunnels for uploading multiple attachments to specified hosting servers. The number of HTTPS tunnels may be determined by balancing system performance against system resource utilization, for example, bandwidth, CPU and memory available on the hosting servers.

To further improve efficiency of uploading the attachment 214, certain embodiments of the present invention may employ technologies to determine if attachment 214 has already been uploaded. For example, by using technologies like MD5, certain embodiments of the present invention may hash the file contents of attachment 214 and compare the hash value with the hash value of files previously uploaded to the hosting server 204 using the same path. This feature may result in an significant gain in bandwidth and storage as the attachment 214 will not be uploaded again if the file-uploading module is able to detect that the attachment 214 already exists on the hosting server 204.

Figure 6:
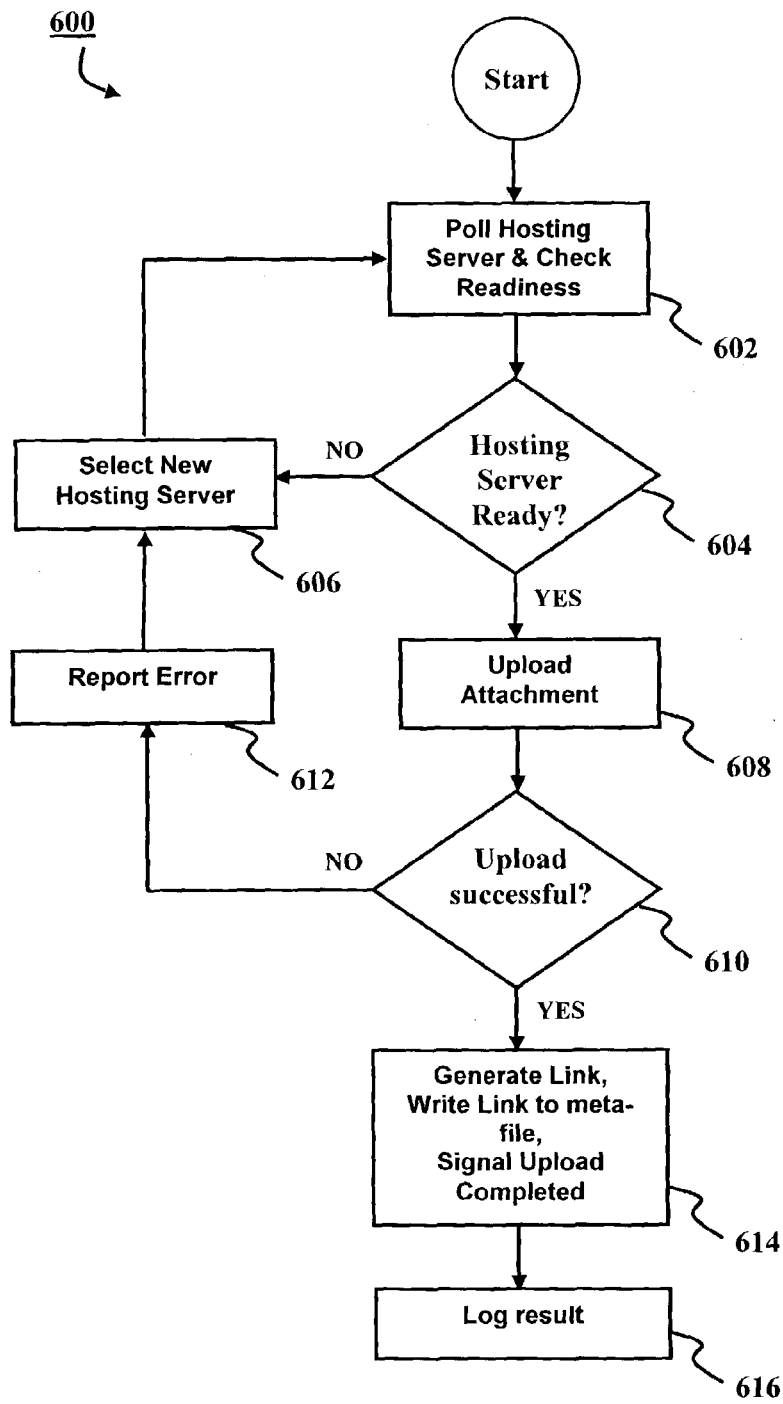
FIG. 6 shows a process flow of a file-uploading task according to at least one embodiment of the invention.

In certain embodiments, the file-uploading module is activated when the user launches the email client application. Like the background email processing module, the file-uploading module may operate in the background, carrying out a file-uploading (FU) task 600 as shown in FIG. 6. The FU task 600 is responsible for efficiently delivering the attachment 214 provided by the BEP task 500 to a pre-specified remote hosting server. A detailed description of the FU task 600 according to at least one embodiment of the invention is provided hereinafter.

Upon finding the attachment 214 in the package processing directory, the FU task 600 may be initiated to upload the attachment 214 to the hosting server 204. In a step 602, the hosting server 204 may be polled to establish communication with the FU task 600. In the step 602, the hosting server 204 may also be polled for any updates to any of the configurable parameters that may control the operation of the BEP task 500 and FU task 600.

In step 604, the hosting server 204 may also check for readiness to deliver the attachment 214 thereto. If the hosting server 204 is not ready, the FU task 600 proceeds to a step 606 where a next hosting server is selected. However, if the hosting server 204 is ready, the attachment 214 (which may be encapsulated as a package) in the package processing directory may be retrieved and uploaded to the hosting server 204 in a step 608. If the package is larger than a preset threshold, the package may be split into small parts in the step 608. These small parts may be recombined at the hosting server 204 to form the package containing the attachment 214. This feature provides certain embodiments of the present invention with the capability to resume interrupted uploads by only uploading the parts of the attachment 214 that cannot be uploaded due to a bad or broken connection which may enhance the overall efficiency of the email distribution network 200.

In certain embodiments, the user may attach more than one attachment to the email. In this embodiment, the FU task 600 continues to retrieve and send all the attachments until the meta-file is found. Once the meta-file is found, it means that the BEP task 500 has finished copying the attachments to the package processing directory. In the step 608, once the attachment 214 is successfully uploaded, the meta-file is uploaded, signaling to the hosting server 204 the end of the uploading session.

In a step 610, a check may be carried out to verify if the attachment 214 and the meta-file are successful delivered to the hosting server 204. If the uploading is unsuccessful, the FU task 600 proceeds to a step 612 where the uploading error is reported before proceeding to the step 606 to select an alternative hosting server to upload to.

If the attachment uploading is successful in the step 610, the FU task 600 may generate a locator code in a step 614. The locator code may be, for example, a secured uniform resource locator (secured URL). The locator code may be stored onto a database and associated with the attachment 214. Once the locator code is generated, a locator object may be generated from the locator code. The locator object is typically referred to as a link for embedding into an email. In at least one embodiment, the BEP task 500 uses the locator object to replace the placeholder in the step 514.

The locator object may be generated dynamically and can encompass security features to prevent unauthorized access to the attachment 214. The security features may comprise cryptographic tokens, shared keys and other authentication mechanisms. For example, the locator object may use a shared key as a means for authentication on a remote storage server and a 128-bit encryption for secured delivery of the attachment 214. The security features can further comprise an expiry date and time. The expiry date and time establishes the life of the locator object, subsequent to which the attachment 214 may not be downloadable from a server storing the attachment 214. Other security features can also comprise components to specify whether the recipient should be verified before downloading the attachment 214, thus preventing attachment forwarding and if a download confirmation email should be sent to the sender once the attachment 214 is successfully downloaded by the recipient. The locator object can optionally contain other information like the job code associated with the attachment pointed to by it.

Once the locator object is generated, the locator object may be written into the meta-file (for use by the BEP task 500), and the package processing directory may be renamed to indicate that attachment 214 is successfully uploaded. The FU task 600 then proceeds to a step 616 to log the results of the delivery and terminates.

The FU task 600 can also comprise a capability to support an optional user interface that can be used to view the attachment uploading progress for feedback to the user.

Hosting Server

The hosting servers 204 and 206 provide a remote file system like functionality wherein it is possible to upload, retrieve and get a listing of files besides allowing optional operations like move or delete on a search result set. Examples of the hosting servers 204 and 206 are HTTP servers, FTP servers and servers that support protocols that are capable of storing and delivering files.

In addition to providing file system like functionality in a secure, fast and reliable manner, the hosting servers 204 and 206 may also provide user registration and authentication features by maintaining a user database. Parameters contained in the meta-file uploaded by the file-uploading task can be used by the hosting servers 204 and 206 to control policies for storage, replication, transport, access, and lifecycle management. The meta-information in the meta-file can comprise sender, recipient list, email server profile for internal recipients, including department and location, file name and extension and job code or project identification associated with the file attached. The hosting server (i.e. hosting server 204) that receives the attachment can replicate the uploaded attachments to the preferred server(s) of all the recipient(s) with their profiles exist either in the enterprise's directory server or in the registered user database immediately after the upload thus ensuring minimum download time for each recipient. The job code associated with each attachment in the meta-file is stored by the hosting server 204 and can be mined to generate usage reports for charging back costs.

The secure link inserted in the email can be clicked by the recipient to retrieve the attachment pointed to by the link either directly without authentication or after being password authenticated depending on the configuration set. This configuration may be done either at the hosting servers 204 and 206 or may be encapsulated as a component in the link itself.

If recipient authentication is required, the authentication can be done by querying pre-determined directory server(s) like the lightweight directory access protocol (LDAP) server belonging to the enterprise or by searching in the registered user database stored in the hosting servers 204 and 206. The recipient can be asked to enter his email address that can be further verified against the original recipient list for the email from the meta-file if so desired. The user can also be required to enter a password, which may be verified by the hosting server from which the attachment is downloaded from either the directory server or the user database. Thus, providing a framework for verifying the recipient before download so that only the intended recipients are allowed to download the attachment. In this way, forwarding the attachment to non-approved recipients is prohibited for attachment containment purposes. This can be useful in the case where the material sent in the attachment is sensitive and requires protection.

In case where the recipient is not found in the directory server or the user database, a new user profile can be created by having the recipient submitting a password and preferred location for future deliveries. If the email address is not found in the recipient list or the password is incorrect then the download can be disallowed; otherwise the download link can be authenticated for validity by the hosting server.

Therefore, the hosting servers 204 and 206 can be configured to disable download by any recipient not on the original mailing list via email forwarding in addition to the authentication mechanism for file delivery described in the foregoing.

Further, if the sender requests for a return receipt using the existing email client application feature, the hosting server can send a download confirmation email to the sender after the attachment is successful downloaded by the intended recipient(s).

File lifecycle management can be controlled by parameters and can be globally enforced, or enforced on a file or hosting server specific basis. This policy can be driven by frequency of access or timeframe. For example, the hosting server could be configured so that the attachment is deleted after all recipients have downloaded the file, or simply after two weeks regardless of the number of access.

Administration and Reporting

Further features such as administration and reporting can be provided for the hosting servers 204 and 206. The administration feature may involve, for example, setting up and modifying the various parameters that decide the policies governing the functioning of the hosting servers 204 and 206 and the email clients 104 (A-B) and 106 (A-B). This can be done by an administrator manually or through an interface to the hosting servers from a different location. The administrator can set or change the primary and secondary location to be used for uploading the attachments. The administrator can set or change the threshold for attachment size that will operate for special attaching for the email clients. Further, the administrator can set or change the time for which the links inserted in the email will cease to be valid after insertion. The administrator can enable or disable automated notification by email to the sender on the successful download of the attachments. The administrator can enable or disable the recipient authentication feature (i.e. the ability to configure whether or not a recipient must enter a password before downloading an attachment).

The hosting servers 204 and 206 can also provide a list of the registered email recipients, addition of new email recipient profiles to the database and setting or changing the recipient profile information such as password and attachment download location preference. For example, administrators can view senders who have used the email distribution network 200 and the details of the attachments sent by the senders. The logs uploaded by the file-uploading task and the information maintained by the hosting servers 204 and 206 can be used to create reports at the file level to provide a comprehensive understanding of attachment resources, the availability, usage and cost of the attachment resources. The same can be done by any event capturing software in place of the logs at the hosting servers 204 and 206. Another word, it is the capturing and processing of events that allow such reports to be created. Thus, the attachment uploading event captured in the logs can be used to generate access statistics details on a per sender basis. The resources (i.e. bandwidth and storage) used can be quantified to track and control expense as well as monitor business practices on a hosting server basis as well as per sender basis.

The logs can be used to create reports that help track individual attachments by date, recipient user identification, file size and time of the attachment download.

Job codes and project identifications in the meta-files can be used to generate reports on resource utilization by account which enable the capture and attribute costs to partners and vendors and facilitate the assigning of profit and lost statement ownership of IT related costs to the relevant departments.

Exemplary Embodiment

To further illustrate at least one embodiment of the invention, one example of sending and receiving an email with a large size attachment is provided hereinafter. In this example, John, an employee of ACME corporation in California sends an email with large size attachment to four recipients namely Annette, a co-worker in Paris, France, Ms. Asako and Mr. Taka who work for Great Production House in Tokyo, Japan and Paul, an employee of Acme Printers, Taiwan.

Figure 7:
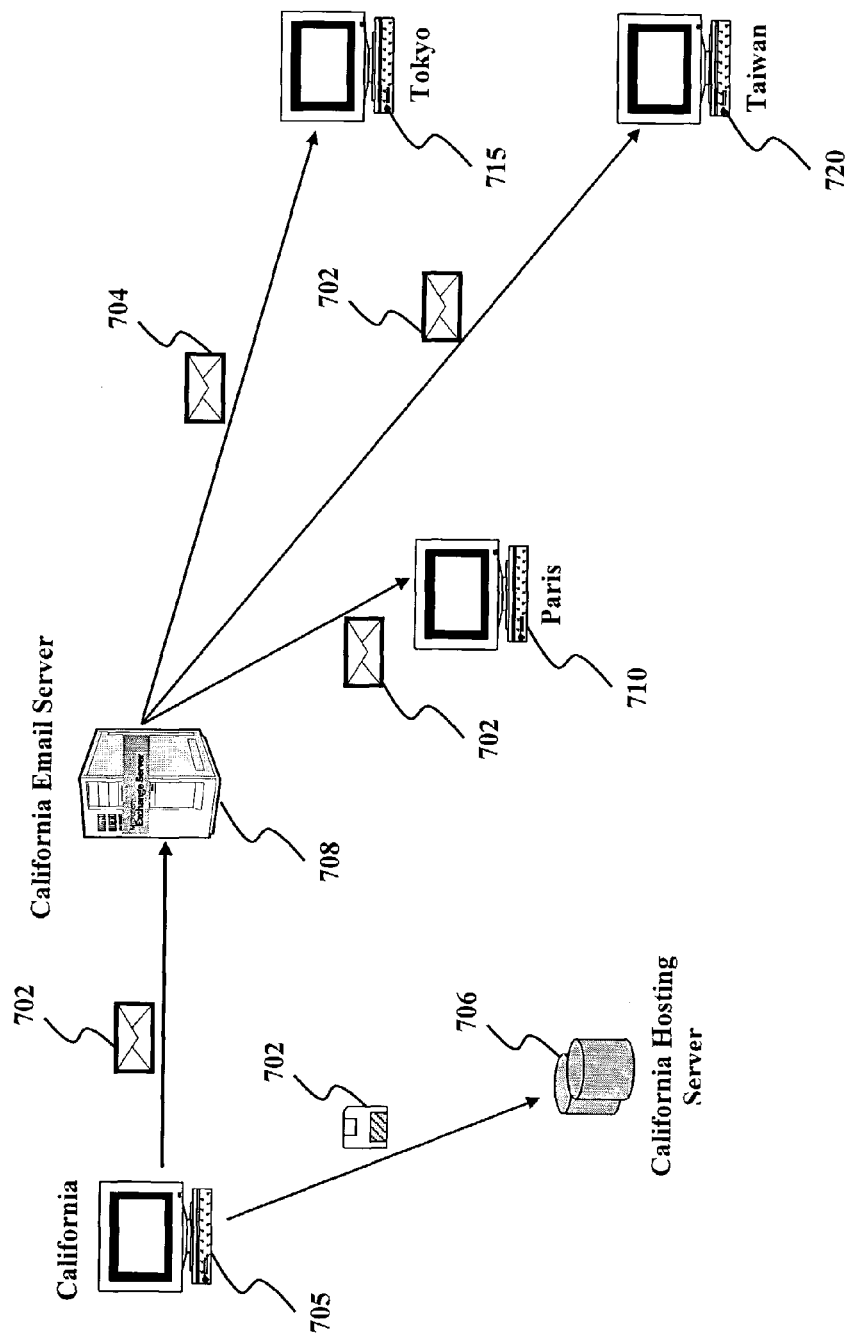
FIGS. 7, 8 and 9 show an exemplary transaction consistent with the present invention.

FIG. 7 shows the sequence of events triggered when John 705 sends out the email. John 705 is able to attach the large file (attachment) 702 and send the email 704 immediately using the email interface component of the file-attaching module that bypasses the normal attachment process by inserting a placeholder and the sending process by moving the email to a pending folder. Thereafter, the background email processing task copies the attachment 702 and a meta-file (for containing the sender email address, recipient list, names of attachments and job code associating with the attachments) into the package processing directory. When the file-uploading task detects the attachment 702 in the package processing directory, it sends the attachment 702 and the meta-file to the California Hosting Server 706. After detecting the successful transfer, the background email processing task replaces the placeholder with a secure URL and sends the email 704 with the secure link to the California eMail Server 708 in the ACME corporate network from where the email is sent onwards to all the recipients.

Figure 8:
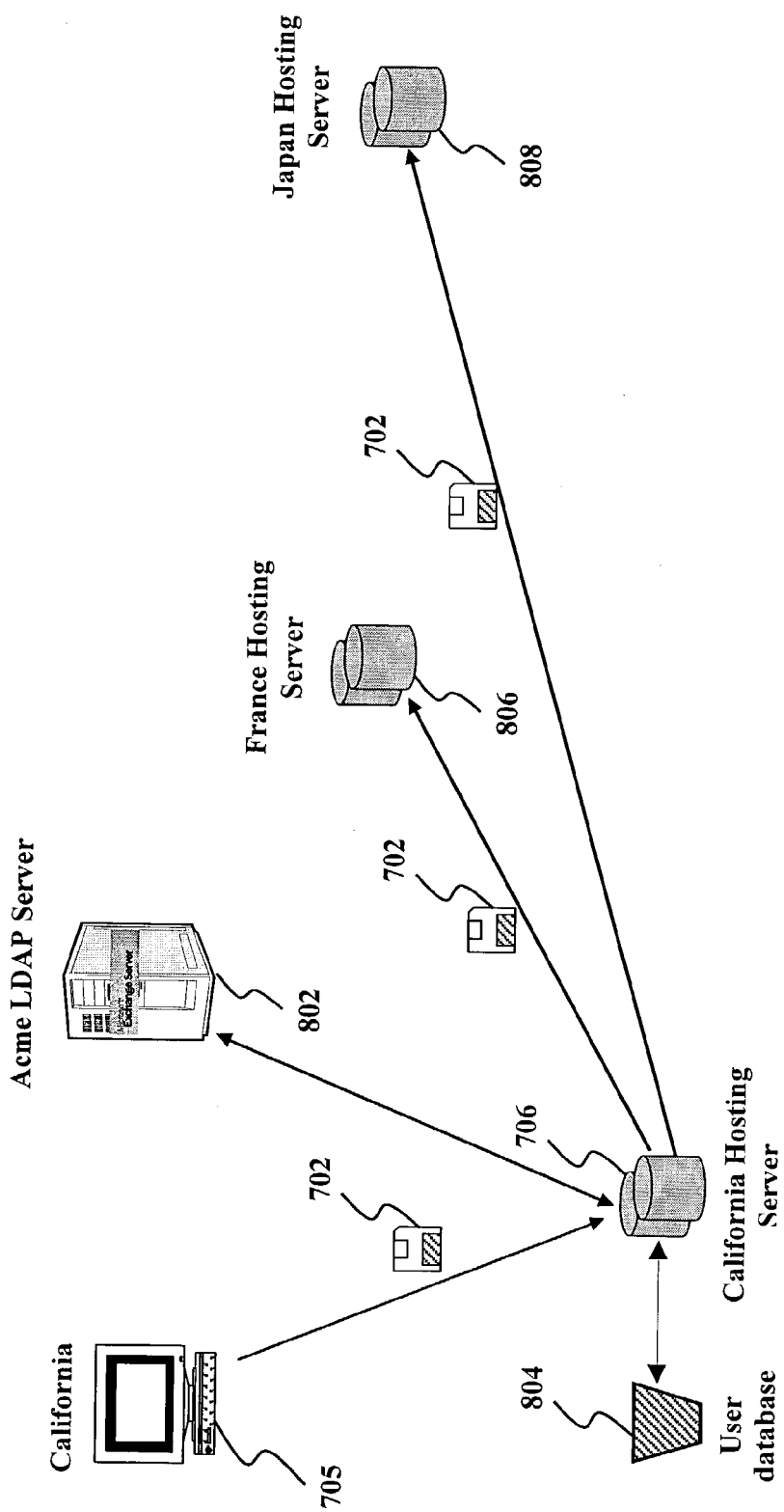

FIG. 8 depicts the optional automated process of replication of file attachments for optimizing the delivery to registered recipients. In the example, assuming that Annette in Paris 715 and Asako in Tokyo 715 have used the system for receiving email attachments before. Thus, Annette has a profile on the ACME's lightweight directory access protocol (LDAP) server 802 while Asako is registered with a recipient profile on the system. As soon as the California hosting server 706 receives the attachment 702, it checks the meta-file to see if any of the recipients are registered with its user database 804 or are part of the ACME's LDAP directory. The attachment 702 is scheduled for replication in the background to the preferred location for Annette (i.e. the France hosting server 806) and for Asako (i.e. the Japan hosting server 808). Since Taka in Tokyo 715 and Paul in Taiwan 720 are not registered yet, no further action is required for the time being.

Figure 9:
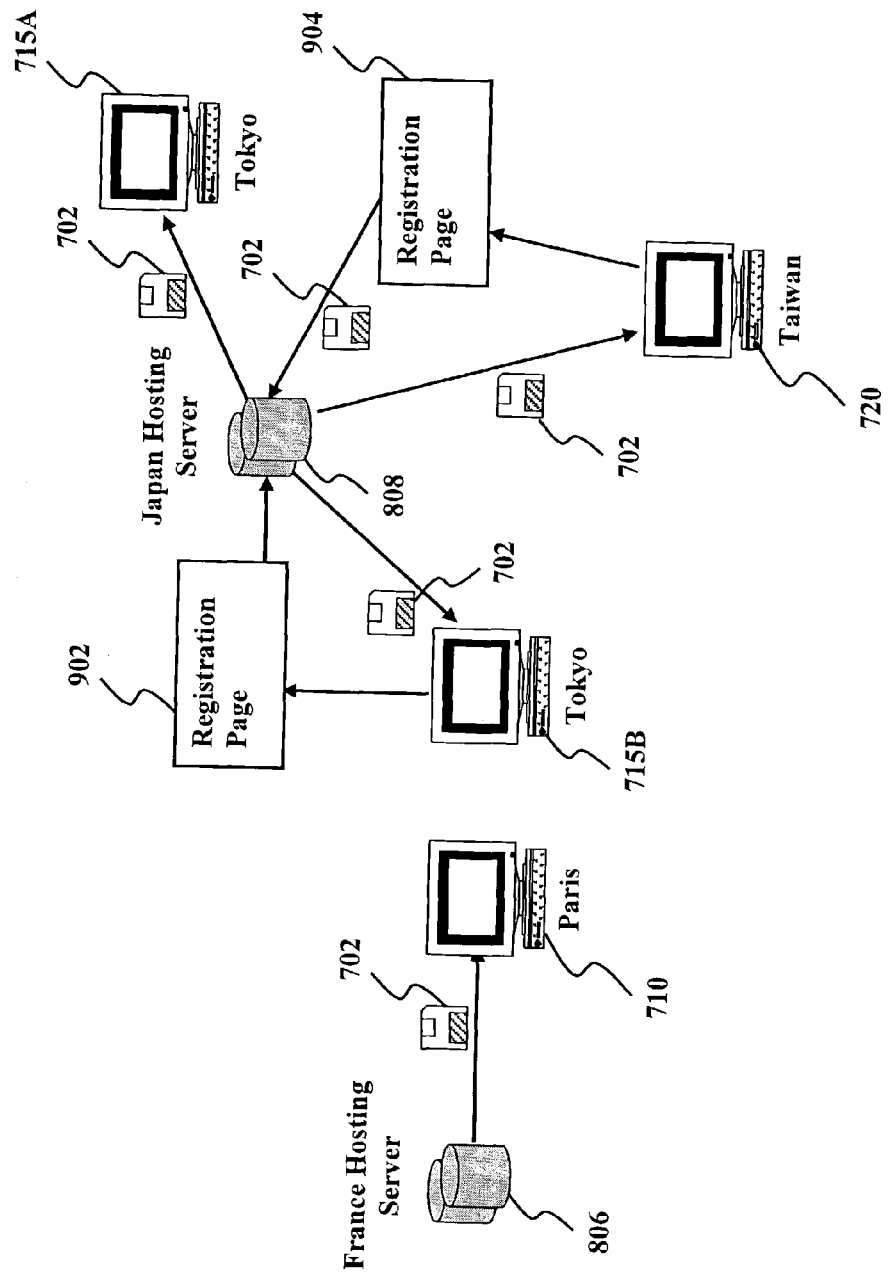

The delivery of the email 704 and the attachment 702 to the recipients in Paris 710 and Tokyo 715 is shown in FIG. 9 after all the four recipients get the same email with the secure link. When Annette clicks on the link in the email, the attachment 702 is immediately downloaded from the France hosting server 806 and no further user action is required. Similarly, when Asako 715A clicks on the link in the email, the attachment 702 is immediately downloaded from the Japan hosting server 808. However, when Taka 715B clicks on the same link, a web page 902 is launched, which prompts him to register his profile by entering his email address, password and a preferred location for future replication, which he can select from a list provided. Taka 715B is then able to select that he too wants to download from the Japan hosting server 808 and since the attachment 702 is already replicated there for Asako 715A, Taka 715B also downloads the attachment 702 from the Japan hosting server 808. Thus, one copy of the attachment 702 at the Japan hosting server 808 is enough for serving the requirements of all recipients who identified the Japan hosting server 808 as their preferred location.

FIG. 9 also depicts the process of attachment delivery to Paul in Taiwan 720. In the example, Paul is also not registered and upon clicking on the link, he is prompted to register himself (via a web page 904) in the same manner as Taka 715B in Tokyo. Paul selects the closest location, which is the Japan hosting server 808 and is able to seamlessly download the attachment 702 after the registration process. Furthermore, future replication and delivery for Paul will be based on his specific profile, which identifies the Japan hosting server 808 as his preferred location.

What is claimed is:

1. A method for delivering a data file selected by a user as an email attachment, the method comprising:
    receiving, by an email client application running on a client computer, an indication to attach a data file to an email;
    generating a placeholder associating the data file with the email, the placeholder identifying the data file;
    inserting, by the email client application, the placeholder into the email in place of the data file;
    receiving, by the email client application, an indication to send the email including the placeholder to a destination system;
    moving, by the email client application in response to the indication to send the email including the placeholder, the email including the placeholder to a pending folder;
    extracting information from the email including the placeholder, the information being descriptive of at least the destination system;
    generating a metadata file based on the extracted information the metadata file identifying at least the destination system;
    moving, by the email client application in response to the indication to send the email including the placeholder, the data file and the metadata file to a packaging folder;
    delivering, by the email client application from the packaging folder, the data file and the metadata file to a hosting server over a first communication link;
    replacing, by the email client application after moving the email including the placeholder to the pending folder, the placeholder in the email including the placeholder with a link indicating a location of the delivered data file; and
    delivering, by the email client application from the pending folder, the email including the link indicating a location of the delivered data file to the email server over a second communication link different from the first communication link.

2. The method as in claim 1, further comprising determining a size of the data file exceeds a preset size, and wherein generating the placeholder is based on the determination of the size of the data file.

3. The method as in claim 1, wherein the metadata file comprises information for controlling, by the host server, at least one of replication of the delivered data file, transport of the delivered data file, access to the delivered data file, and lifecycle management of the delivered data file.

4. The method as in claim 1, further comprising including, by the email client application, a unique identifier in the metadata file, the unique identifier being associated with the data file for tracking purposes.

5. The method as in claim 1, wherein the extracted information is further descriptive of the email or the data file.

6. The method as in claim 1, wherein delivering the data file and the metadata file to the hosting server comprises:
    selecting the hosting server from a file hosting server list containing a plurality of servers, the plurality of servers being arranged in sequence based on preference;
    loading the data file and the metadata file onto the hosting server; and
    generating the link from a data file address of the data file, the data file address indicating the hosting server.

7. The method as in claim 1, wherein the link comprises a uniform resource locator (URL), a uniform resource identifier (URI), or a uniform resource name (URN).

8. The method as in claim 1, wherein the location comprises a data file address of the data file.

9. The method as in claim 1, wherein the link further comprises an authentication key for retrieving the delivered file from the hosting server.

10. A system for delivering a data file selected by a user as an email attachment, the system comprising:
at least one processor; and
at least one non-transitory computer-readable medium storing instructions that, when executed by the at least one processor, cause the system to perform operations comprising:
receiving, by an email client application, an indication to attach a data file to an email;
generating a placeholder associating the data file with the email, the placeholder identifying the data file;
inserting, by the email client application, the placeholder into the email in place of the data file;
receiving, by the email client application, an indication to send the email including the placeholder to a destination system;
moving, by the email client application in response to the indication to send the email including the placeholder, the email including the placeholder to a pending folder;
extracting information from the email including the placeholder, the information being descriptive of at least the destination system;
generating a metadata file based on the extracted information, the metadata file identifying at least the destination system;
moving, by the email client application in response to the indication to send the email including the placeholder, the data file and the metadata file to a packaging folder;
delivering, by the email client application from the packaging folder, the data file and the metadata file to a hosting server over a first communication link;
replacing, by the email client application after moving the email including the placeholder to the pending folder, the placeholder in the email including the placeholder with a link indicating a location of the delivered data file; and
delivering, by the email client application from the pending folder, the email including the link indicating a location of the delivered data file to the email server over a second communication link different from the first communication link.

11. The system as in claim 10, the operations further comprising determining a size of the data file exceeds a preset size, and wherein generating the placeholder is based on the determination of the size of the data file.

12. The system as in claim 10, wherein the metadata file comprises information for controlling, by the host server, at least one of replication of the delivered data file, transport of the delivered data file, access to the delivered data file, and lifecycle management of the delivered data file.

13. The system as in claim 10, further comprising including, by the email client application, a unique identifier in the metadata file, the unique identifier being associated with the data file for tracking purposes.

14. The system as in claim 10, wherein the extracted information is further descriptive of the email or the data file.

15. The system as in claim 10, wherein delivering the data file and the metadata file to the hosting server comprises:

selecting the hosting server from a file hosting server list containing a plurality of servers, the plurality of servers being arranged in sequence based on preference;
loading the data file and the metadata file onto the hosting server; and
generating the link from a data file address of the data file, the data file address indicating the hosting server.

16. The system as in claim 10, wherein the link comprises a uniform resource locator (URL), a uniform resource identifier (URI), or a uniform resource name (URN).

17. The system as in claim 10, wherein the location comprises an authentication key for retrieving the delivered file from the hosting server.

18. A non-transitory computer readable medium storing instructions that, when executed by at least one processor of a system, cause the system to perform operations comprising:
receiving, by an email client application, an indication to attach a data file to an email;
generating a placeholder associating the data file with the email, the placeholder identifying the data file;
inserting, by the email client application, the placeholder into the email in place of the data file;
receiving, by the email client application, an indication to send the email including the placeholder to a destination system;
moving, by the email client application in response to the indication to send the email including the placeholder, the email including the placeholder to a pending folder;
extracting information from the email including the placeholder, the information being descriptive of at least the destination system;
generating a metadata file based on the extracted information the metadata file identifying at least the destination system;
moving, by the email client application in response to the indication to send the email including the placeholder, the data file and the metadata file to a packaging folder;
delivering, by the email client application from the packaging folder, the data file and the metadata file to a hosting server over a first communication link;
replacing, by the email client application after moving the email including the placeholder to the pending folder, the placeholder in the email including the placeholder with a link indicating a location of the delivered data file; and
delivering, by the email client application from the pending folder, the email including the link indicating a location of the delivered data file to the email server over a second communication link different from the first communication link.

19. The non-transitory computer readable medium as in claim 18, wherein delivering the data file and the metadata file to the hosting server comprises:
selecting the hosting server from a file hosting server list containing a plurality of servers, the plurality of servers being arranged in sequence based on preference;
loading the data file and the metadata file onto the hosting server; and
generating the link from a data file address of the data file, the data file address indicating the hosting server, the link comprising a uniform resource locator (URL), a uniform resource identifier (URI), or a uniform resource name (URN).

20. The system as in claim 18, wherein the link further comprises an authentication key for retrieving the delivered file from the hosting server.

\* \* \* \* \*